US009107199B2

(12) United States Patent
Kang et al.

(10) Patent No.: US 9,107,199 B2
(45) Date of Patent: Aug. 11, 2015

(54) METHOD FOR TRANSMITTING SIGNAL IN MULTI-NODE SYSTEM

(75) Inventors: Ji Won Kang, Anyang-si (KR); Su Nam Kim, Anyang-si (KR); Bin Chul Ihm, Anyang-si (KR); Jin Young Chun, Anyang-si (KR); Sung Ho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 169 days.

(21) Appl. No.: 13/876,885

(22) PCT Filed: Sep. 30, 2011

(86) PCT No.: PCT/KR2011/007235

§ 371 (c)(1), (2), (4) Date: Mar. 29, 2013

(87) PCT Pub. No.: WO2012/044111

PCT Pub. Date: Apr. 5, 2012

(65) Prior Publication Data

US 2013/0201953 A1 Aug. 8, 2013

Related U.S. Application Data

(60) Provisional application No. 61/388,581, filed on Sep. 30, 2010.

(51) Int. Cl.
*H04W 72/04* (2009.01)
*H04B 7/02* (2006.01)

(52) U.S. Cl.
CPC ............... *H04W 72/04* (2013.01); *H04B 7/024* (2013.01)

(58) Field of Classification Search
CPC ............................... H04B 7/024; H04W 72/04
USPC .......................................... 370/328, 329, 338
See application file for complete search history.

(56) References Cited

U.S. PATENT DOCUMENTS

| | | | | |
|---|---|---|---|---|
| 6,272,450 | B1 * | 8/2001 | Hill et al. | 703/13 |
| 2005/0226201 | A1 * | 10/2005 | McMillin | 370/348 |
| 2006/0230238 | A1 * | 10/2006 | Roy et al. | 711/141 |
| 2007/0093209 | A1 * | 4/2007 | Agrawal et al. | 455/63.1 |
| 2008/0119155 | A1 * | 5/2008 | Bobier | 455/275 |
| 2008/0130790 | A1 | 6/2008 | Forenza et al. | |
| 2008/0189028 | A1 * | 8/2008 | Nair et al. | 701/200 |
| 2009/0047956 | A1 * | 2/2009 | Moe et al. | 455/436 |
| 2010/0097939 | A1 * | 4/2010 | Yoneta | 370/242 |

(Continued)

OTHER PUBLICATIONS

Mitchell, "Emerging Radio-Over-Fiber Technologies and Networks: Challenges and Issues", Proc. of SPIE, vol. 7234, 723407, 2009, 8 pages.

(Continued)

*Primary Examiner* — Brian D Nguyen
(74) *Attorney, Agent, or Firm* — Birch, Stewart, Kolasch & Birch, LLP

(57) ABSTRACT

Provided is a method of transmitting a signal of a multi-node system employing a plurality of nodes and a plurality of base stations that can be controlled by being connected with the plurality of nodes. The method includes: mapping at least one base station among the plurality of base stations to at least one node among the plurality of nodes; and transmitting by the at least one base station a signal to a user equipment via the mapped node, wherein the plurality of nodes are installed in a geographically distributed manner, and the node mapped to the at least one base station varies temporally.

8 Claims, 11 Drawing Sheets

(56) References Cited

U.S. PATENT DOCUMENTS

| | | | | |
|---|---|---|---|---|
| 2010/0177759 | A1 | 7/2010 | Fischer et al. | |
| 2010/0189044 | A1* | 7/2010 | Roy et al. | 370/328 |
| 2010/0265866 | A1* | 10/2010 | Chao et al. | 370/312 |

OTHER PUBLICATIONS

Wake et al., "Radio Over Fiber Link Design for Next Generation Wireless Systems", Journal of Lightwave Technology, vol. 28, No. 16, Aug. 15, 2010, pp. 2456-2464.

* cited by examiner 202
201
203
204
BSC/RNC
Traditional RAN Architecture
(Three Sector Cell Sites)

Small Cell RAN Architecture with BTS Hotel and DAS
(Each Hexagon is a Cell Site)

METHOD FOR TRANSMITTING SIGNAL IN MULTI-NODE SYSTEM

CROSS REFERENCE TO RELATED APPLICATIONS

This application is the National Phase of PCT/KR2011/007235 filed on Sep. 30, 2011, which claims priority under 35 U.S.C. 119(e) to U.S. Provisional Application No. 61/388,581 filed on Sep. 30, 2010, all of which are hereby expressly incorporated by reference into the present application.

TECHNICAL FIELD

The present invention relates to wireless communications, and more particularly, to a method of transmitting a signal in a multi-node system.

BACKGROUND ART

A data transfer amount of a wireless network has been rapidly increased in recent years. It is because various devices, e.g., a smart phone, a tablet personal computer (PC), or the like, that require machine-to-machine (M2M) communication and a high data transfer amount have been introduced and distributed. To satisfy the required high data transfer amount, a carrier aggregation (CA) technique, a cognitive radio technique, or the like for effectively using more frequency bands and a multiple antenna technique, a multiple base station cooperation technique, or the like for increasing data capacity within a limited frequency have recently drawn attention.

In addition, the wireless network has been evolved in a direction of increasing density of a node capable of accessing to an area around a user. Herein, the node implies an antenna (or antenna group) which is separated from a distributed antenna system (DAS) by more than a certain distance. However, the node is not limited to this definition, and thus can also be used in a broader sense. That is, the node may be a pico-cell eNB (PeNB), a home eNB (HeNB), a remote radio head (RRH), a remote radio unit (RRU), a relay, a distributed antenna (group), etc. A wireless communication system having nodes with higher density can provide higher system performance by cooperation between nodes. That is, better system performance can be achieved when one base station controller manages transmission and reception of respective nodes and thus the nodes operate as if they are antennas or an antenna group for one cell, in comparison with a case where the respective nodes operate as an independent base station (BS), advanced BS (ABS), Node-B (NB), eNode-B (eNB), access point (AP), etc., and thus do not cooperate with each other. Hereinafter, a wireless communication system including a plurality of nodes is referred to as a multi-node system.

If each node of the multi-node system performs scheduling and handover by having its own identifier (ID), such a multi-node system can be regarded as a multi-cell system. If a coverage of each cell (i.e., node) is overlaid in the multi-cell system, such a multi-cell system is called a multi-tier network.

Accordingly, there is a need for a method capable of effectively transmitting a signal in a multi-node system.

SUMMARY OF INVENTION

Technical Problem

The present invention provides a signal transmission method in a multi-node system.

Technical Solution

According to an aspect of the present invention, there is provided a method of transmitting a signal of a multi-node system employing a plurality of nodes and a plurality of base stations that can be controlled by being connected with the plurality of nodes. The method includes: mapping at least one base station among the plurality of base stations to at least one node among the plurality of nodes; and transmitting by the at least one base station a signal to a user equipment via the mapped node, wherein the plurality of nodes are installed in a geographically distributed manner, and the node mapped to the at least one base station varies temporally.

In the aforementioned aspect of the present invention, the method may further include: transmitting a downlink signal by a single base station included in the plurality of base stations to the user equipment via a first node group based on a first base station-node mapping relation; receiving a negative acknowledgement (NACK) signal from the user equipment to indicate that the downlink signal is not successfully received; determining a second base station-node mapping relation between the single base station and the plurality of nodes; and retransmitting by the single base station a downlink signal to the user equipment via a second node group based on the second base station-node mapping relation.

In addition, if a plurality of nodes are mapped to the at least one base station, the plurality of nodes may transmit signals by using the same cell identification (ID).

In addition, each of the plurality of base stations may be connected to a base station controller capable of controlling all of the plurality of base stations.

In addition, the mapping of the at least one base station among the plurality of base stations to the at least one node among the plurality of nodes may be performed by the base station controller.

In addition, the plurality of base stations may be installed in a geographically centralized manner.

In addition, at least one base station among the plurality of base stations may be mapped in such a manner that the at least one base station is not connected to any node among the plurality of nodes.

According to another aspect of the present invention, there is provided a method of transmitting a signal of a multi-node system employing a plurality of nodes and a plurality of base stations that can be controlled by being connected with the plurality of nodes. The method includes: mapping at least one base station among the plurality of base stations to at least node among the plurality of nodes; and transmitting by the at least one base station a signal to a user equipment via the mapped node, wherein the as least one base station includes a plurality of baseband processors, and at least one baseband processor among the plurality of baseband processors is mapped to the at least one node.

In the aforementioned aspect of the present invention, a mapping relation between the at least one baseband process and the at least one node may be changeable.

In addition, at least one baseband processor among the plurality of baseband processors may be mapped to a different node according to a radio resource.

In addition, the baseband processor mapped to the different node may transmit a signal based on a different cell ID according to a radio resource.

According to another aspect of the present invention, there is provided a method of transmitting a signal of a multi-node system employing a plurality of nodes and a plurality of base stations that can be controlled by being connected with the plurality of nodes. The method includes: mapping at least two baseband processors to at least one node among the plurality of nodes; and transmitting a signal to a user equipment via the at least one node, wherein, when the signal is generated, the at least one node uses a different cell ID according to an allocated physical radio resource or physical channel, and the different cell ID is determined according to a cell ID used by the at least two baseband processors.

In the aforementioned aspect of the present invention, the at least two baseband processors may be all included in the same base station or are included separately in two different base stations.

In addition, if the at least two baseband processors are included respectively to a first base station and a second base station and if the first base station and the second base station are mapped to the at least one node, a control signal may be transmitted according to a cell ID of the first base station in a first radio resource region among allocated radio resources, and a data signal may be transmitted according to a cell ID of the second base station in a second radio resource region.

Advantageous Effects

The conventional wireless communication system requires a process of exchanging data and control signals for a user equipment which serves as a target user equipment between base stations in order to perform joint processing among a plurality of base stations. However, the exchanging of data and control signals is unnecessary in the present invention because one base station or channel card controls all radio resources allocated to the user equipment. Therefore, there is an advantage in that a processing delay time is significantly decreased.

MODE FOR INVENTION

The technology described below can be used in various multiple access schemes such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA2000. The TDMA can be implemented with a radio technology such as global system for mobile communications (GSM)/general packet ratio service (GPRS)/enhanced data rates for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunications system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the LTE. The IEEE 802.11m is an evolution of the IEEE 802.16e.

Figure 1:
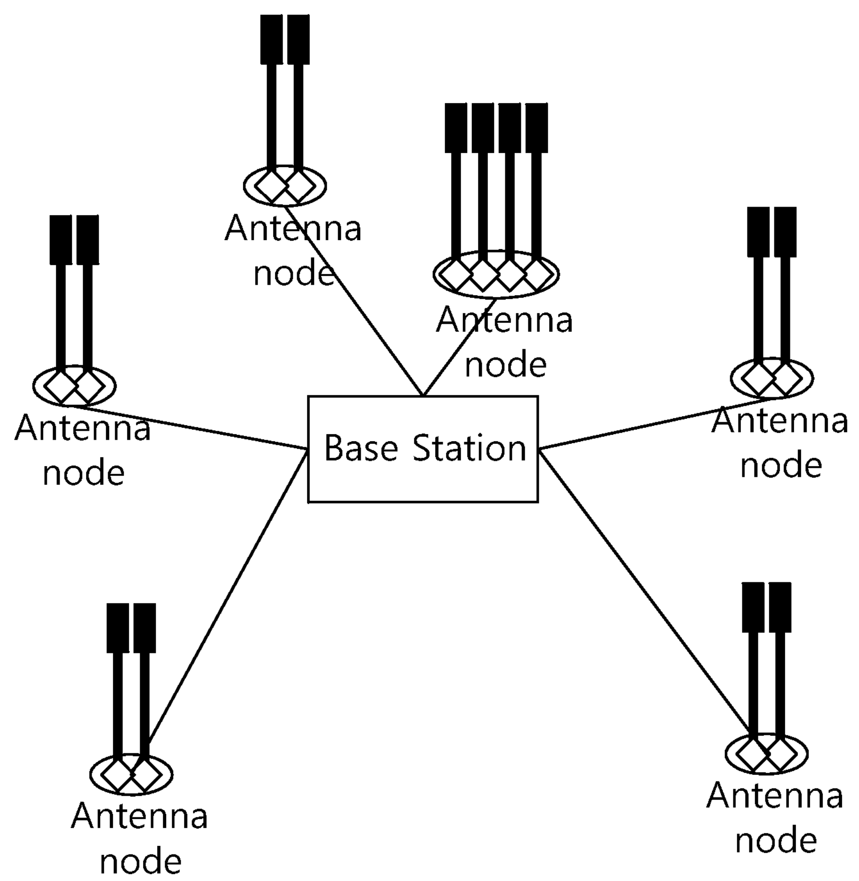
FIG. 1 shows an example of a multi-node system.

FIG. 1 shows an example of a multi-node system.

Referring to FIG. 1, the multi-node system includes a base station (BS) and a plurality of nodes.

The BS provides a communication service to a specific geographical region. The BS is generally a fixed station that communicates with a user equipment (UE) and may be referred to as another terminology, such as an evolved Node-B (eNB), a base transceiver system (BTS), etc.

A distributed antenna is shown in FIG. 1 as an example of a node, and in this sense, is denoted by an antenna node (AN). However, the node is not limited to the distributed antenna, and thus may be, for example, a macro eNB antenna, a pico-cell eNB (PeNB), a home eNB (HeNB), a remote radio head (RRH), a relay, etc. The node is also referred to as a point.

The AN is connected to the BS in a wired/wireless fashion, and each AN may consist of one antenna or an antenna group. Antennas belonging to one AN may be located geographically within several meters and show the same feature. In the multi-node system, the AN serves as an access point (AP) to which the UE can access.

In a case where the node consists of antennas in the multi-node system as described above, it may be called a distributed antenna system (DAS). That is, the DAS is a system in which antennas (i.e., nodes) are deployed in various positions in a geographically distributed manner, and these antennas are managed by the BS. The DAS is different from a conventional centralized antenna system (CAS) in which antennas of the BS are centralized in a cell center.

If the antennas are deployed in a geographically distributed manner, it may imply that, if one receiver receives the same signal from antennas, the antennas are deployed such that a channel state difference between each antenna and the receiver is greater than or equal to a specific value. If the antennas are deployed in a centralized manner, it may imply that the antennas are deployed in a localized manner such that a channel state difference between each antenna and one receiver is less than a specific value (the same is also true when a transmission entity is a BS). The specific value can be determined variously according to a frequency, service type, etc., used by the antennas.

Figure 2:
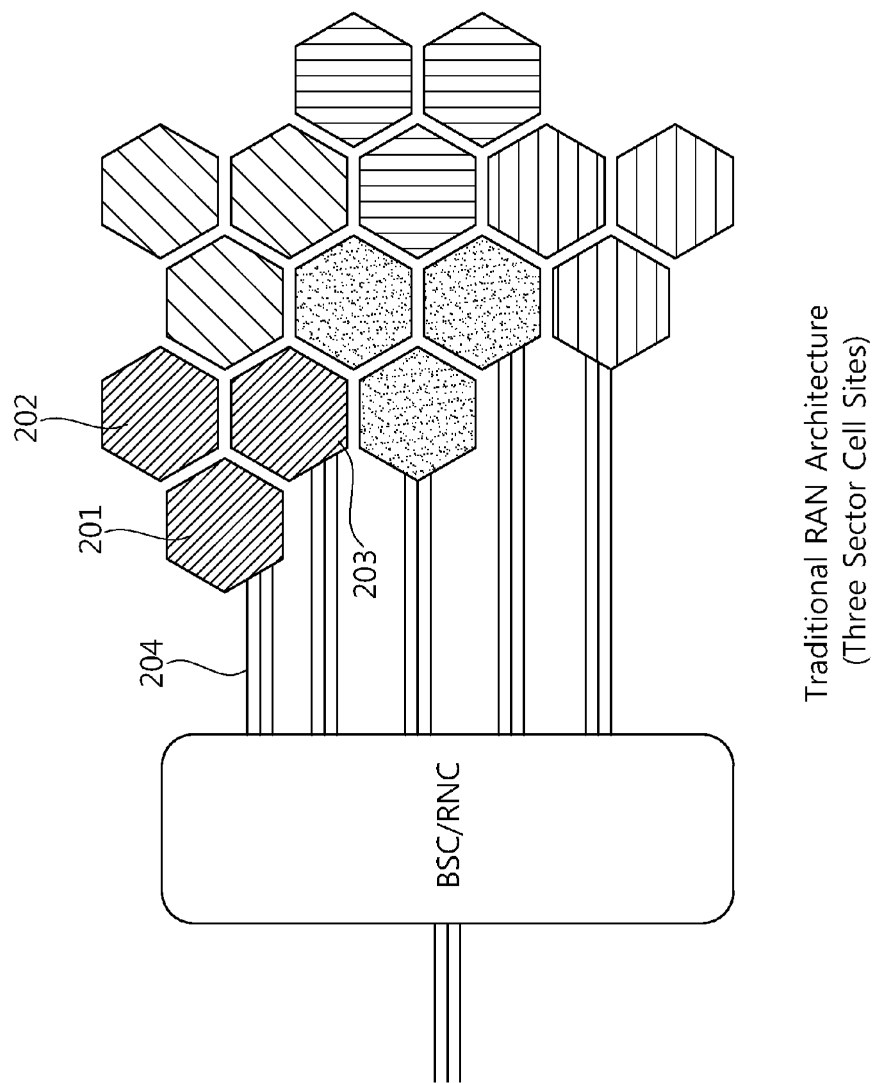
FIG. 2 shows a radio access structure of the conventional wireless communication system.

FIG. 2 shows a radio access structure of the conventional wireless communication system.

Referring to FIG. 2, the conventional wireless communication system may be a cellular system. In the cellular system, a BTS controls three sectors (e.g., 201, 202, and 203) constituting a cell, and each BTS is connected to a base station controller/radio network controller (BSC/RNC, hereinafter, collectively called a BSC) via a backbone network 204. In the conventional wireless communication system, each BTS is deployed in a cell controlled by the BTS itself in general.

Figure 3:
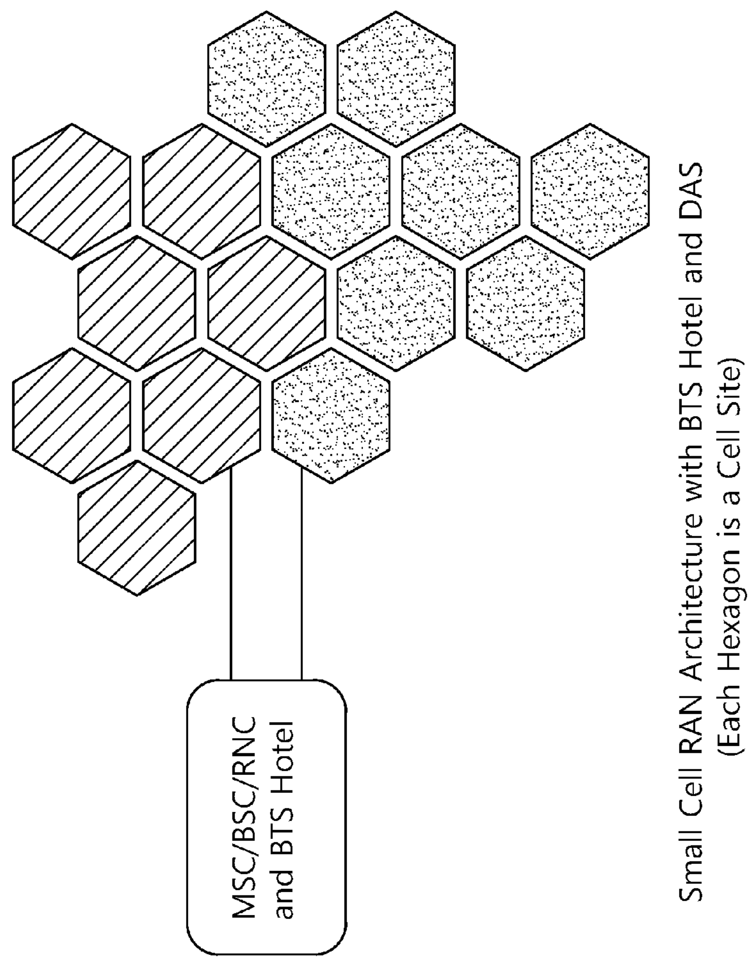
FIG. 3 shows a radio access structure of a wireless communication system to which the concept of a base transceiver system (BTS) hotel is applied.

FIG. 3 shows a radio access structure of a wireless communication system to which the concept of a BTS hotel is applied.

Referring to FIG. 3, each of BTSs can be connected through ANs deployed in a distributed manner in cells, an optical fiber, etc., and the respective BTSs are installed in a specific region in a localized manner instead of being deployed in cells controlled by the BTSs. When a plurality of BTSs which manage such distributed cells are deployed and managed by grouping the BTSs in a specific region, it is called a BTS hotel. BTSs which are grouped and installed by the concept of the BTS hotel have an advantage in that costs for a land, a building, etc., in which the BTS is installed can be decreased, and costs of maintenance/management/repair can be decreased. In addition, the BTSs and the BSC/RNC can be installed in one place all together to increase backhaul capacity. The concept of the BTS hotel can be applied to a distributed antenna system.

Figure 4:
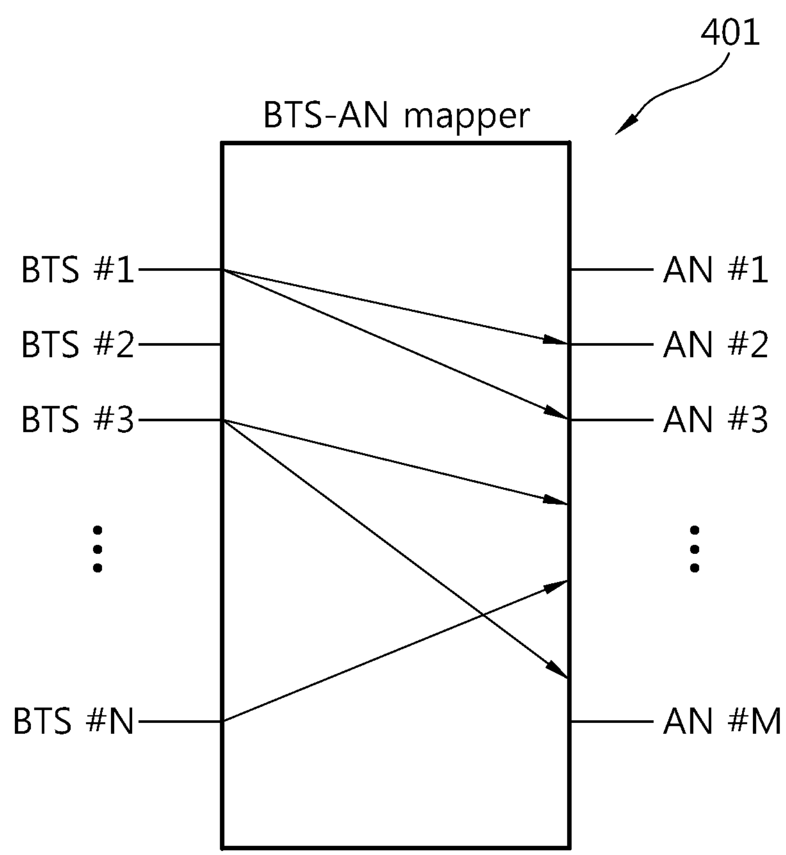
FIG. 4 shows an example of determining a structure of an antenna node (AN) controlled by a BTS by using a BTS hotel in a distributed antenna system.

FIG. 4 shows an example of determining a structure of an AN controlled by a BTS by using a BTS hotel in a distributed antenna system.

Referring to FIG. 4, a BSC may include a BTS-AN mapper 401 for controlling and managing a connection between the BTS and the AN.

According to the BTS-AN mapper 401, the following two operations can be achieved. That is, 1) one BTS can be connected to one or a plurality of ANs, wherein the ANs connected to one BTS may be deployed geographically in the same cell or may be deployed in different cells, and 2) some of the ANs and the BTSs managed by the BTS-AN mapper 401 may be in an off-state without being mapped to each other. For example, in FIG. 4, a BTS #2 is not mapped to any AN, and an AN #1 is not mapped to any BTS. As such, the BTS in the off-state may be a reserved BTS for a case where a required data amount is instantaneously increased at a region controlled by BTSs belonging to the BTS hotel. In addition, the AN in the off-state may be instantaneously off for the purpose of reducing an interference to another AN or for the purpose of saving power in the absence of a neighboring UE.

Since a configuration of a connection between the BTS and the AN is changeable instantaneously by the BTS-AN mapper 401, the number of BTSs to be activated among BTSs belonging to the BTS hotel and the configuration and the number of ANs controlled by each BTS can be changed freely according to the required data amount or for the purpose of interference control based on a UE distribution. From the viewpoint of the AN, a BTS for controlling the AN is changeable instantaneously.

Figure 5:
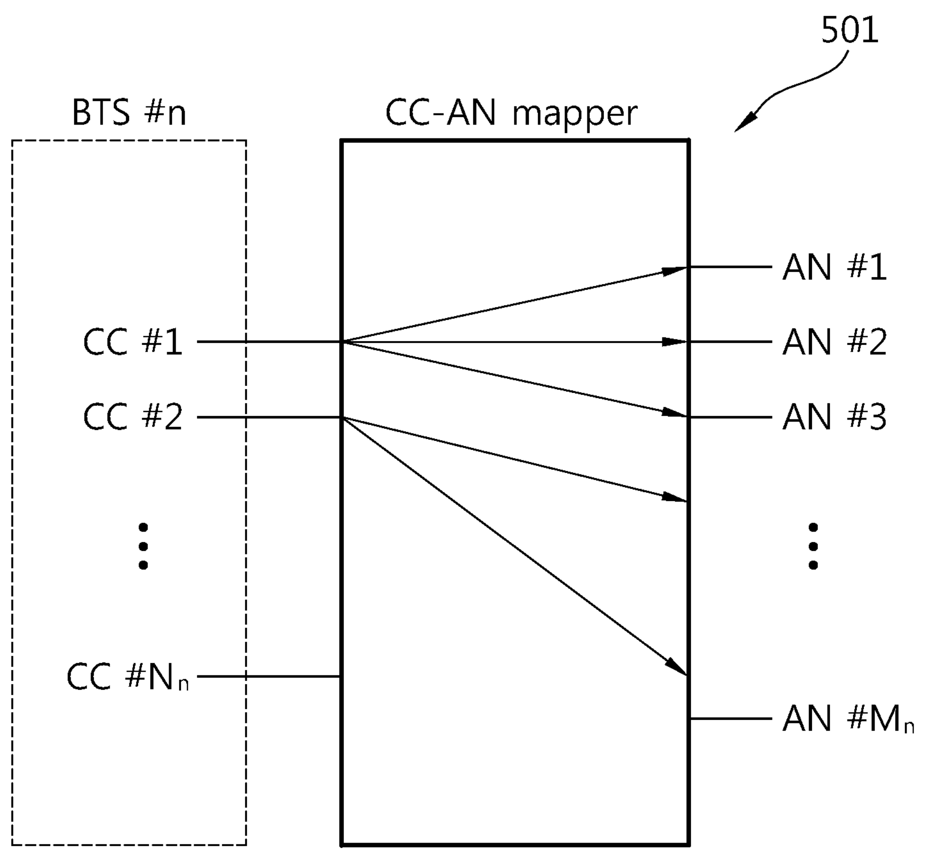
FIG. 5 shows a mapping relation between one BTS and an AN.

FIG. 5 shows a mapping relation between one BTS and an AN.

Each of BTSs included in a BTS hotel may include a plurality of channel cards (CCs) for processing a baseband signal. For example, the BTS may include three CCs to process three channels configured with different three frequency bands. Of course, the number of CCs included in the BTS is not limited to 3, and thus may be greater than or equal to 4 or may be less than or equal to 2. The BTS may include a CC-AN mapper 501 which controls/manages a connection between the CC and the AN.

The CC-AN mapper 501 controls and manages a connection between the AN and the CC in the BTS. For example, it is assumed that any BTS existing in the BTS hotel is denoted by a BTS #n, and the number of CCs existing in the BTS #n is Nn. In addition, it is assumed that the number of ANs mapped to the BTS #n is Mn. In this case, the CC-AN mapper 501 controls/manages a connection between each CC in the BTS #n and an AN mapped to the BTS #n. In this case, each CC may be connected to one or a plurality of ANs (case 1) or may not be connected to any AN (case 2). For example, in FIG. 5, a CC #1 may be connected to three ANs AN #1, AN #2, and AN #3, and a CC #Nn may not be connected to any AN.

Each CC may have a different cell ID when operating. In this case, when a CC connected to each AN is instantaneously changed, it implies that a cell ID of a corresponding AN is changeable instantaneously.

Figure 6:
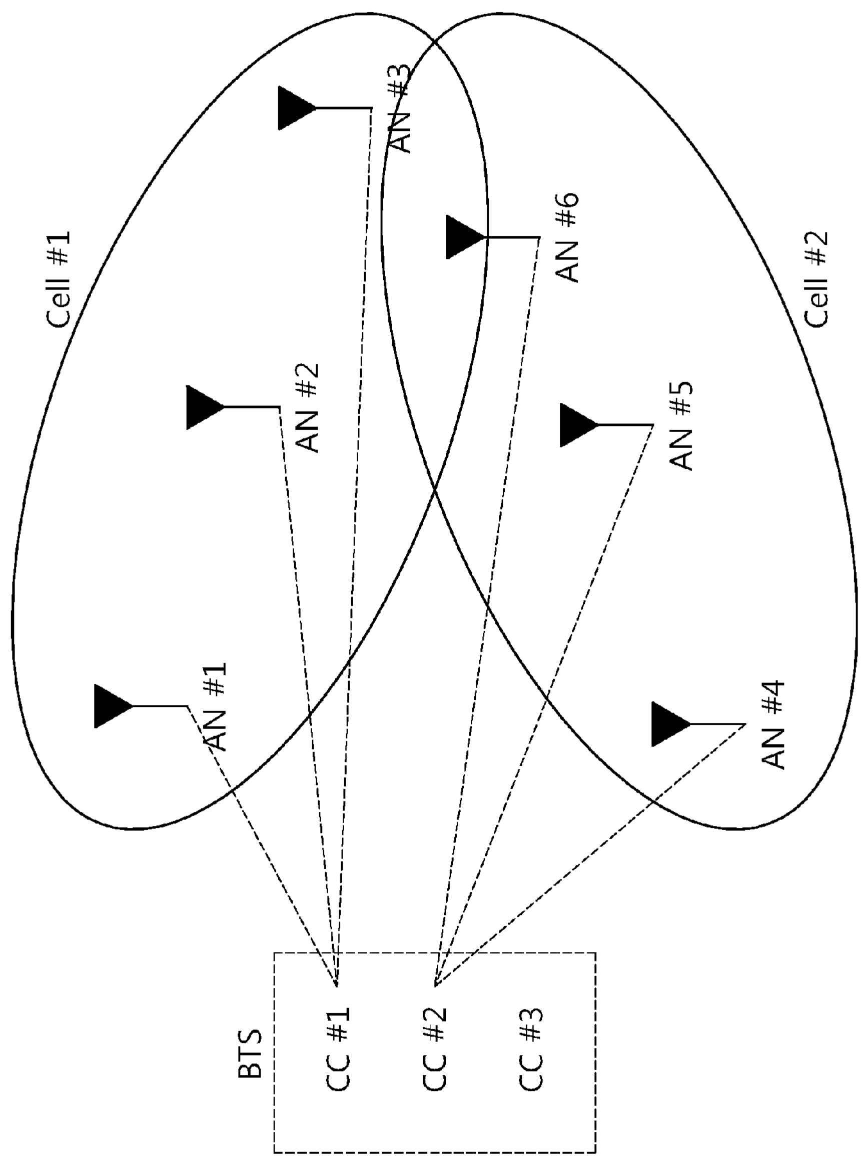
FIG. 6 to FIG. 8 show examples of changing a cell configuration by changing a connection between a channel card (CC) and an AN by a CC-AN mapper.
Figure 7:
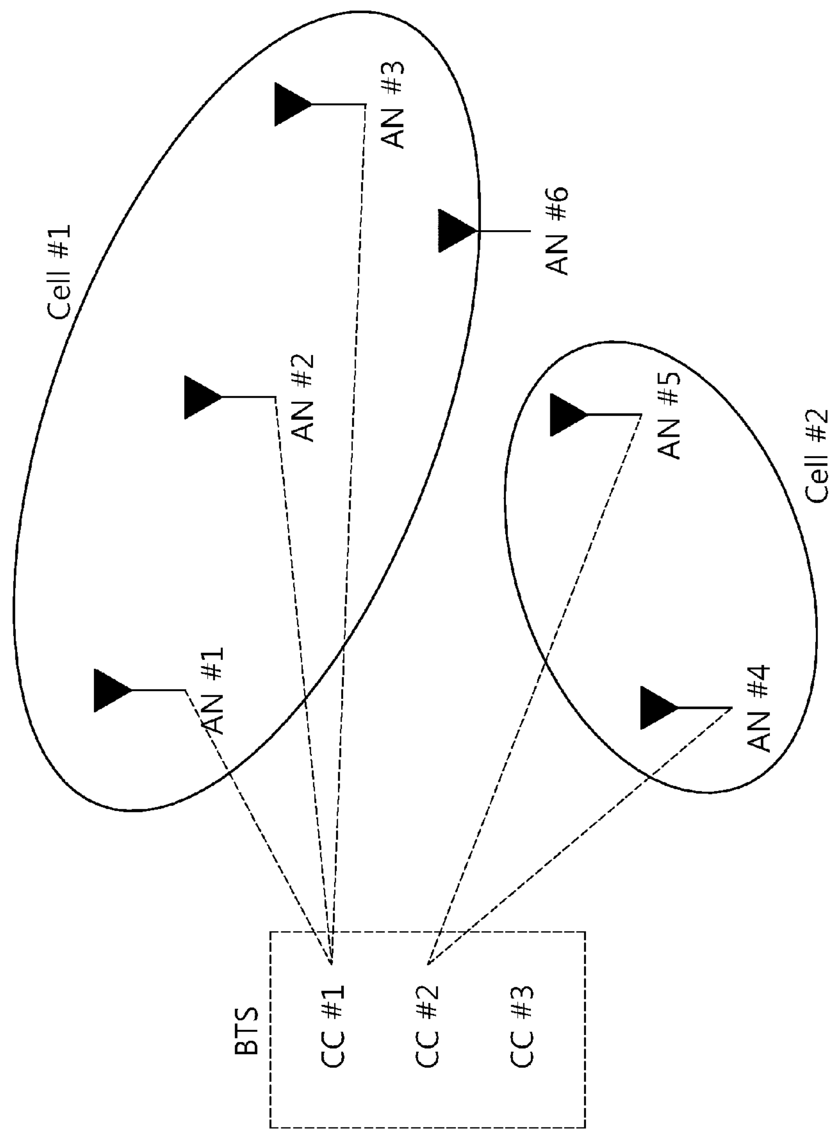
Figure 8:
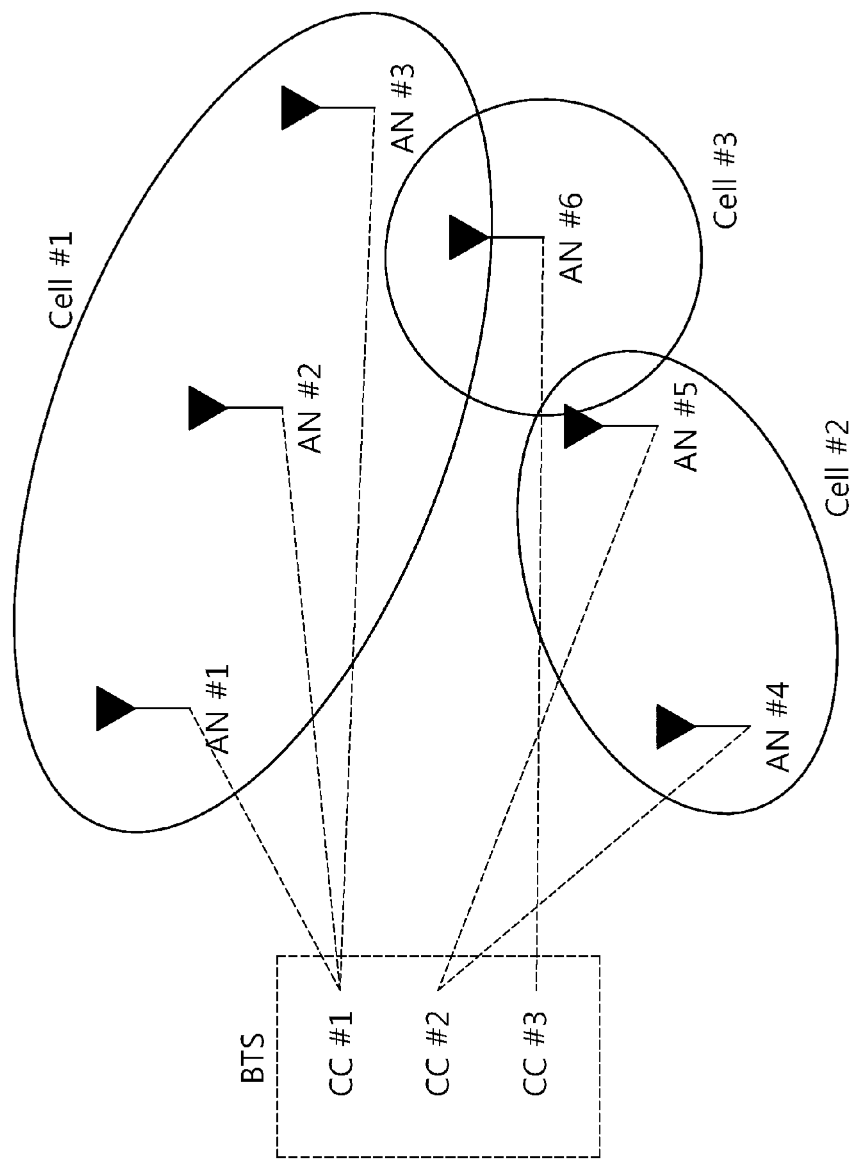

FIG. 6 to FIG. 8 show examples of changing a cell configuration by changing a connection between a CC and an AN by a CC-AN mapper.

Referring to FIG. 6, a CC #1 and {AN #1, AN #2, AN #3} are connected to configure a cell #1, and a CC #2 and {AN #4, AN #5, AN #6} are connected to configure a cell #2. That is, two cells can be configured by using two CCs.

Referring to FIG. 7, a CC #1 and {AN #1, AN #2, AN #3} are connected to configure a cell #1, and a CC #2 and {AN #4, AN #5} are connected to configure a cell #2. In addition, an AN #6 is not connected to any CC, and thus is excluded from the cell configuration. The AN #6 may be an AN reserved for the purpose of cancelling an interference of a UE located in a cell edge or for the purpose of increasing AN power efficiency, etc. In comparison with FIG. 6, only an AN is changed in the cell #2 while maintaining the same cell ID.

Referring to FIG. 8, a CC #1 and {AN #1, AN #2, AN #3} are connected to configure a cell #1, a CC #2 and {AN #4, AN #5} are connected to configure a cell #2, and a CC #3 and an AN #6 are connected to configure a cell #3. That is, three cells can be configured by using all of three CCs. When the cell configuration of FIG. 7 is changed to the cell configuration of FIG. 8, it can be regarded that a cell is added since the number of UEs is instantaneously increased in a region controlled by a BTS or a required data amount is increased. In the added cell #3, for example, a synchronization signal can be transmitted by using a cell ID of the cell #2 while transmitting data for a UE which is not supported by the cell #2.

By instantaneously changing a connection between an AN and a CC of a BTS as shown in FIG. 6 to FIG. 8, the present invention can effectively cope with the number of UEs in a region controlled by the BTS, a required data amount, etc.

As such, a process of temporally changing a cell configuration can be performed at the request of a UE, or can be performed by a decision of a BTS or a BSC/RNC. For example, the UE may measure a reference signal received from an AN and request a change of a cell configuration when a channel state becomes worse than a specific value. The BTS or the BSC/RNC may count the number of times of NACK transmission attempts of the UE and change a cell configuration when NACK transmission is repeated by more than a specific value. Alternatively, the BTS or the BSC/RNC may analyze density of UEs and location information of the UEs to change the cell configuration.

Figure 9:
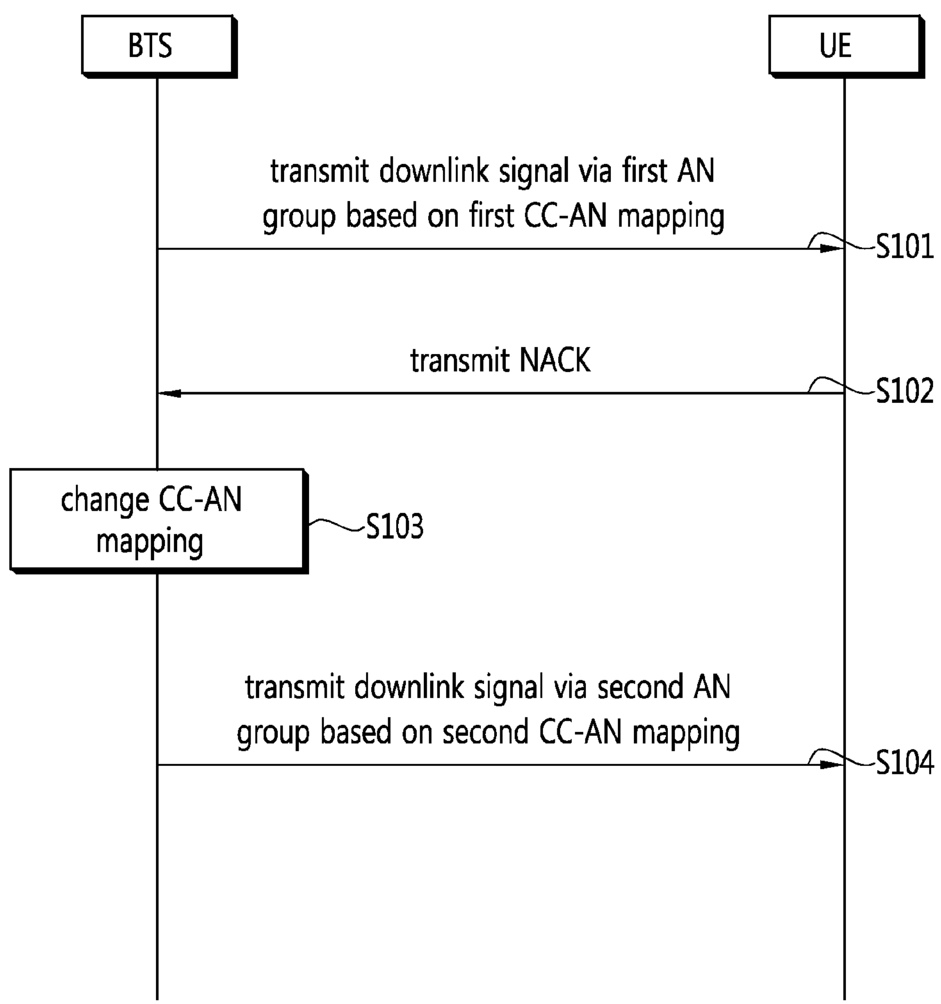
FIG. 9 shows an example of a signaling process between a user equipment (UE) and a BTS in a process of changing a cell configuration by changing a connection between a CC and an AN by a CC-AN mapper.

FIG. 9 shows an example of a signaling process between a UE and a BTS in a process of changing a cell configuration by changing a connection between a CC and an AN by a CC-AN mapper.

Referring to FIG. 9, the BTS transmits a downlink signal to the UE via a first AN group based on first CC-AN mapping (step S101). If the downlink signal is not successfully decoded, the UE transmits NACK (step S102). If the UE transmits the NACK more than a specific number of times and a ratio of ACK:NACK is greater than or equal to a specific value, the BTS changes the CC-AN mapping (step S103). For example, the BTS may change the CC-AN mapping from the first CC-AN mapping to second CC-AN mapping. The BTS transmits the downlink signal via a second AN group based on the second CC-AN mapping (step S104).

Although it is described above with reference to FIG. 4 and FIG. 5 that the BTS-AN mapper 401 and the CC-AN mapper 501 are controlled by one BTS or CC with respect to all allocated radio resources from the viewpoint of the AN, the present invention is not limited thereto. That is, in some radio resources, ANs can be controlled by different BTSs or CCs.

Figure 10:
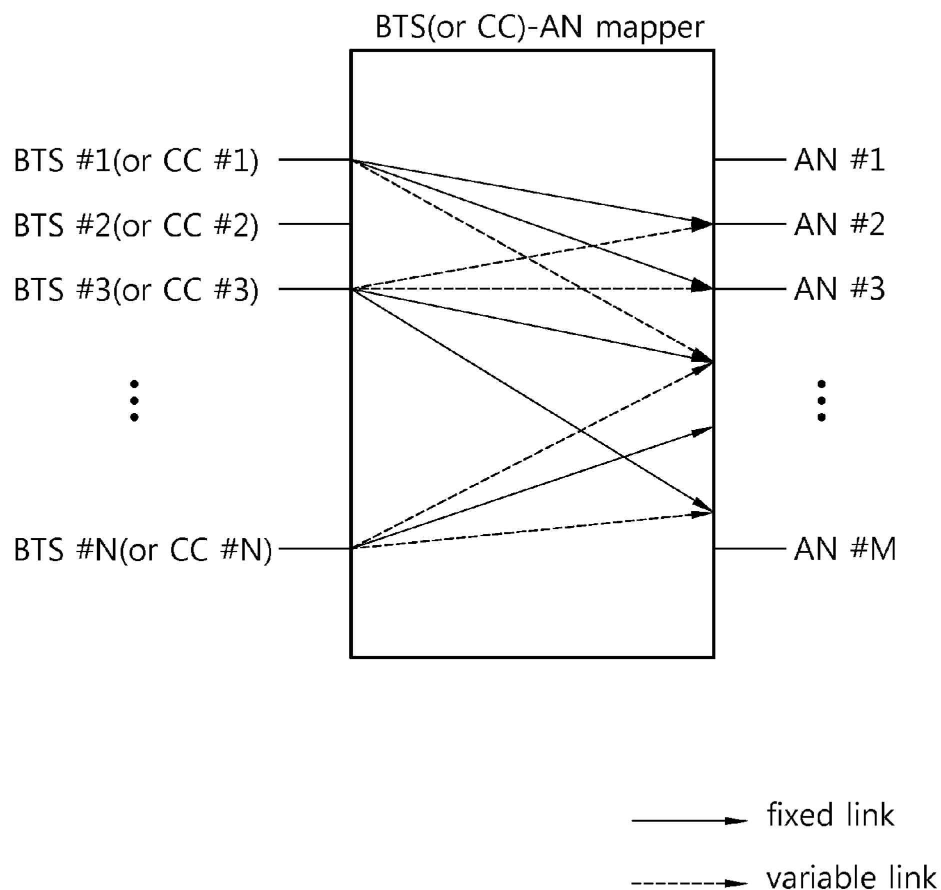
FIG. 10 shows another example of mapping between a BTS and an AN or between a CC and an AN.

FIG. 10 shows another example of mapping between a BTS and an AN or between a CC and an AN.

Referring to FIG. 10, an AN #2 is controlled by a BTS #1 in a fixed manner. That is, the BTS #1 is a main BTS of the AN #2. However, some radio resources allocated to the AN #2 can be flexibly controlled by a BTS #3 which is not the main BTS. In FIG. 10, a link between a main BTS and an AN is indicated by a fixed link, and a link between an AN and a BTS which flexibly controls some radio resources is indicated by a variable link. The some radio resources may imply some areas of a physical resource (e.g., a subframe in a time domain, a subcarrier or resource block in a frequency domain, etc.), or may imply a specific type of physical signal or channel among various physical signals and channels defined in a physical layer.

For example, the main BTS of the AN #2 may be the BTS #1 having a cell ID #1. In this case, in the AN #2, a system parameter and signal depending on a cell ID are controlled by the BTS #1 and the cell ID #1 is used. Examples of the system parameter and signal depending on the cell ID include a synchronization signal, a broadcast channel, a scrambling parameter of a signal, a permutation parameter of a radio resource, etc. Therefore, the system parameter and signal are generated and transmitted on the basis of the cell ID #1. In addition, a physical downlink shared channel (PDSCH) and a demodulated reference signal (DM RS) are also transmitted on the basis of the cell ID #1.

In addition, the AN #2 can be controlled by the BTS #3 having a cell ID #3 with respect to some physical resource blocks (PRBs), physical resource units (PRUs), some signal types, etc. For example, a PDSCH and a DM RS of the BTS #3 can be transmitted in some radio resources.

That is, each AN is based on a cell ID of a main BTS in signal transmission based on the cell ID, and a signal which is not dependent on the cell ID can be controlled by a BTS having another cell ID. In this case, a radio resource controlled by a BTS having another cell ID is a part of radio resources allocated to an AN.

Figure 11:
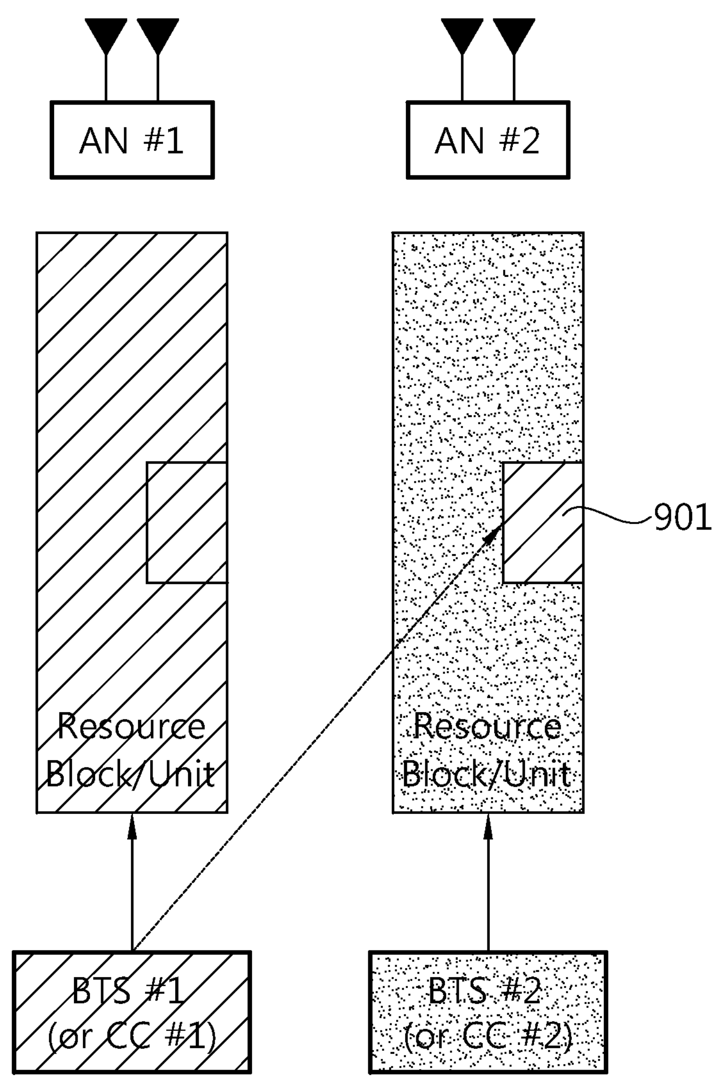
FIG. 11 shows an example of a connection between different BTS or CCs according to a resource allocated to an AN described in FIG. 10.

FIG. 11 shows an example of a connection between different BTS or CCs according to a resource allocated to an AN described in FIG. 10.

Referring to FIG. 11, a BTS #1 is a main BTS of an AN #1, and can control some radio resources 901 allocated to an AN #2. A BTS #2 is a main BTS of the AN #2. In this case, it can be said that two BTSs are mapped to the AN #2. The BTS #1 and the BTS #2 can transmit signals to a UE via the AN #2. In this case, the AN #2 uses a different cell ID according to an allocated physical radio resource or physical channel, and the different cell ID can be determined according to the BTS #1 and the BTS #2.

If the BTS #1 and the BTS #2 are mapped to the AN #2, the AN #2 can transmit a control signal (e.g., a synchronization signal, a cell-specific reference signal, etc.) according to a cell ID of the BTS #1 in some radio resources among allocated radio resources, and can transmit a data signal (e.g., PDSCH, DL/UL DM RS, positioning RS, etc.) according to a cell ID of the BTS #2 in the remaining radio resources. The BTS #1 and the BTS #2 require a process of exchanging and requesting/accepting information on an AN controlled by themselves and information on a radio resource via a BTS/RNC. Although it is described above that two BTSs are mapped to one AN for example, the present invention is also equally applicable to a case where a plurality of CCs are mapped to one AN.

According to the method described above with reference to FIG. 10 and FIG. 11, a cell ID of an AN is fixed without alternation, and thus a UE can avoid confusion in a handover process. In addition, since a resource allocated to each UE can be flexibly used, an interference between ANs can be decreased.

The conventional wireless communication system requires a process of exchanging data and control signals for a UE which serves as a target UE between BTSs in order to perform joint processing among a plurality of BTSs. However, the exchange of data and control signals is unnecessary in the present invention because one BTS or CC controls all radio resources allocated to the UE. Accordingly, there is an advantage in that a processing delay time is significantly decreased.

The aforementioned method and apparatus can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of transmitting a signal of a multi-node system employing a plurality of nodes and a plurality of base stations that are controlled by being connected with the plurality of nodes, the method comprising:

mapping at least one base station among the plurality of base stations to at least one node among the plurality of nodes; and transmitting by the at least one base station a signal to a user equipment via the mapped node, wherein the plurality of nodes are installed in a geographically distributed manner, and the node mapped to the at least one base station varies temporally, wherein each of the plurality of base stations is connected to a base station controller capable of controlling all of the plurality of base stations, and wherein the mapping of the at least one base station among the plurality of base stations to the at least one node among the plurality of nodes is performed by the base station controller using a plurality of fixed links and a plurality of variable links.

2. The method of claim 1, further comprising:

transmitting a downlink signal by a single base station included in the plurality of base stations to the user equipment via a first node group based on a first base station-node mapping relation;

receiving a negative acknowledgement (NACK) signal from the user equipment to indicate that the downlink signal is not successfully received;

determining a second base station-node mapping relation between the single base station and the plurality of nodes; and retransmitting by the single base station a downlink signal to the user equipment via a second node group based on the second base station-node mapping relation.

3. The method of claim 1, wherein if a plurality of nodes are mapped to the at least one base station, the plurality of nodes transmit signals by using the same cell identification (ID).

4. The method of claim 1, wherein the plurality of base stations are installed in a geographically centralized manner.

5. The method of claim 1, wherein at least one base station among the plurality of base stations is mapped in such a manner that the at least one base station is not connected to any node among the plurality of nodes.

6. A method of transmitting a signal of a multi-node system employing a plurality of nodes and a plurality of base stations that are controlled by being connected with the plurality of nodes, the method comprising:

mapping at least one base station among the plurality of base stations to at least one node among the plurality of nodes; and transmitting by the at least one base station a signal to a user equipment via the mapped node, wherein the at least one base station includes a plurality of baseband processors, and at least one baseband processor among the plurality of baseband processors is mapped to the at least one node using a plurality of fixed links and a plurality of variable links, wherein at least one baseband processor among the plurality of baseband processors is mapped to a different node according to a radio resource, and wherein the at least one baseband processor mapped to the different node transmits a signal based on a different cell identification (ID) according to the radio resource.

7. The method of claim 6, wherein a mapping relation between the at least one baseband process and the at least one node is changeable.

8. A method of transmitting a signal of a multi-node system employing a plurality of nodes and a plurality of base stations that are controlled by being connected with the plurality of nodes, the method comprising:

mapping at least two baseband processors to at least one node among the plurality of nodes; and transmitting a signal to a user equipment via the at least one node, wherein, when the signal is generated, the at least one node uses a different cell identification (ID) according to an allocated physical radio resource or physical channel, and wherein the different cell ID is determined according to a cell ID used by the at least two baseband processors, wherein the at least two baseband processors are all included in the same base station or are included separately in two different base stations, and wherein if the at least two baseband processors are included respectively in a first base station and a second base station and if the first base station and the second base station are mapped to the at least one node, a control signal is transmitted according to a cell ID of the first base station in a first radio resource region among allocated radio resources, and a data signal is transmitted according to a cell ID of the second base station in a second radio resource region.

* * * * *